Jan. 4, 1949.  M. PIMENTEL  2,458,416

RAKE ATTACHMENT FOR LAWN MOWERS

Filed May 31, 1946

INVENTOR
MANUEL PIMENTEL
BY Darby & Darby
ATTORNEYS

Patented Jan. 4, 1949

2,458,416

UNITED STATES PATENT OFFICE 2,458,416

RAKE ATTACHMENT FOR LAWN MOWERS

Manuel Pimentel, Mamaroneck, N. Y.

Application May 31, 1946, Serial No. 673,570

5 Claims. (Cl. 56—249)

This invention relates to rake attachments for lawn mowers.

It has been the experience of those mowing lawns with the usual type lawn mower, either the hand operated or the power operated type, to find a number of narrow rows of long grass standing up uncut a few hours after the lawn has been mowed. This condition has existed in spite of the fact that great care is taken to overlap the cutting blades with the cut portion of the grass with each mowing row. The cause of this has been found to be the wheel of the mower which, running through the long grass on one side, presses down the grass in passing over it. The grass remains pressed down for a time so that on the return mowing row the cutters of the lawn mower pass over the top. Later, this little row of grass springs back to its original position, thus leaving the narrow row of uncut grass.

A number of rakes have been made available for attachment to lawn mowers. All of these, however, have been made to mount between the wheels of the mower in a position immediately in front of the mowing blades. These rakes have been designed for the purpose of raking aside spurious pieces of grass and twigs lying in the path of the mower and also to rake up crab grass which grows horizontally along the ground. These rakes are unnecessarily large, cumbersome and expensive for use in raking up the narrow path of grass which has been pressed down by the wheel of the lawn mower. These rakes also suffer the disadvantage of catching any little mounds of earth which may be existent in the average lawn. While the wheels of the mower might pass on either side of this little mound the rake would, of course, dig into it. Also, if the wheel passes over the little mound the action raises the rake above its normal level so that momentarily it passes above the grass and does not accomplish its raking function.

It is therefore the object of this invention to provide a small, light and inexpensive rake which may conveniently be attached to a lawn mower and which will pick up the narrow path of grass which has been pressed down by the wheel of the mower.

Figure 1:
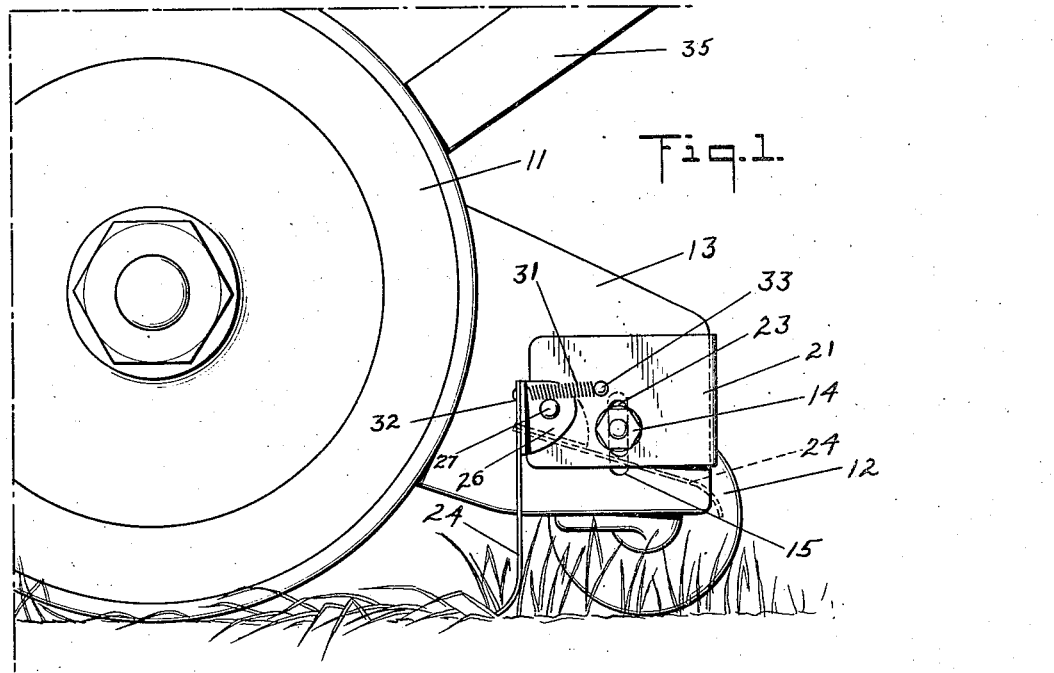
Figure 1 is a side elevation showing a portion of a lawn mower with a rake in accordance with this invention attached thereto.

The usual lawn mower comprises a pair of relatively large side wheels, one of which may be seen at 11. Between these side wheels is mounted the rotary cutting blades (not shown). Mounted behind the mower so as to follow the path of the cutting blades there is provided a small roller 12. This roller is attached to the frame of the lawn mower by the roller bracket 13. The roller 12 is usually in adjustable position by utilizing a mounting bolt 14 slidably in an elongated slot 15 in the roller bracket 13.

This roller bracket 13 provides a convenient location for attaching the rake in accordance with this invention. Thus, I have provided a rectangular mounting plate 21, one end 22 of which is folded so as to be normal to the plane of the plate. Such a mounting plate or bracket may be fitted snugly to the roller bracket 13 with the end 22 of plate 21 folded around the rear portion of the roller bracket 13.

This mounting plate 21 may then be adjustably mounted by providing a vertical elongated slot 23 so that the rake may be attached to the lawn mower by using the same bolt 14 which has already been provided for the roller 12.

For the actual raking function there is provided a pair of tines 24. It will be apparent that any number of tines may be provided but two has been found to be very satisfactory. These tines 24 may be made of thin pieces of any suitable resilient metal so as to provide a desired amount of flexibility. The tines 24 may be attached to a laterally extending bracket 25 by any suitable means such as, for instance, spot welding. The bracket 25 has a portion 26 folded normal to the plane thereof which is pivotally attached to the forward edge of the mounting plate 21 by any suitable means such as, for instance, a rivet 27. It will be apparent that the bracket 25 together with tines 24 may be made of a unitary piece, thus forming a U-shaped structure.

Figures 2, 3:
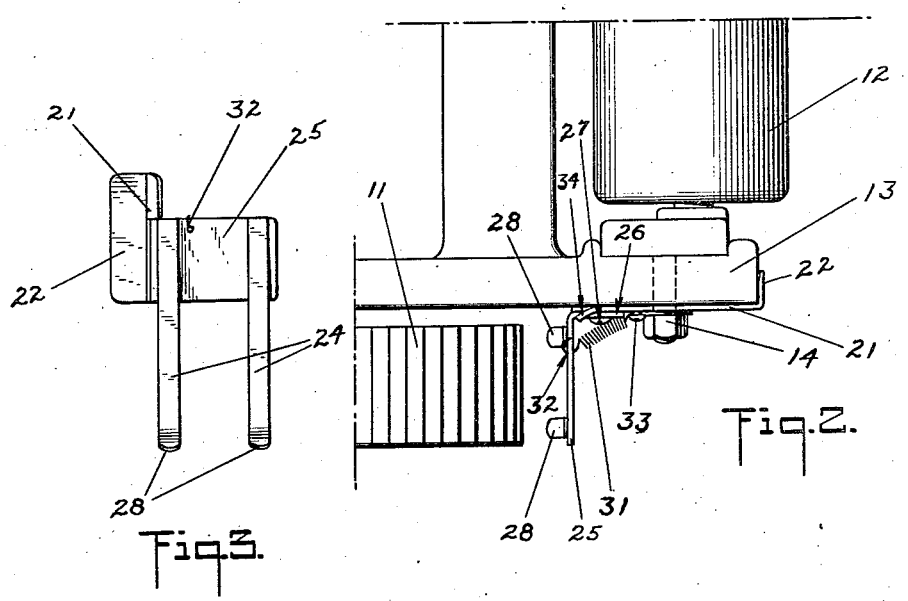
Figure 2 is a plan view of Figure 1.
Figure 3 is a front elevation of the rake itself.

In this way the raking tines are mounted on the lawn mower, in a position immediately following the wheel of the mower. The tines are long enough to extend to the ground so as to exert a drag when the mower is being pushed forwardly. The lower ends 28 of the tines may be curved forward slightly as seen in Figures 1 and 2 although it will be apparent that this is not necessary.

Since the tines are pivotally attached to the bracket there is provided a small coil spring 31, one end of which may be attached to the upper edge of the bracket 25 by means of a suitable small hole 32. One end of the spring extending through the hole curls around the upper edge of the bracket 25, providing the suitable attachment. The other end of the spring is attached to the mounting plate 21 by means of a small rivet 33. Rivet 33 is placed above the horizontal line passing through rivet 27 so as to provide a toggle action for the pivotally mounted raking tines 24. In this way the action of the spring 31 mounted above the fulcrum of the raking tines urges the lower ends 28 of the tines forwardly. At the same time the pivotal action allows the tines to be pressed backwardly by any obstruction. They may, for instance, be raised off the ground completely as shown in dotted lines in Figure 1.

The upper forward edge 34 of the rake bearing mounting plate 21 may be slitted longitudinally a short distance in from the forward edge so that this edge may be flared outwardly a small amount to provide a suitable stop for the pivotal action of the tines 24. It will be apparent that this is only one expedient and any suitable stopping means may be provided.

It has been found that the wheel 11 of the lawn mower presses the blades of the grass sideways in passing over the lawn and not entirely forwardly as would be expected. Since the blades of the grass are pressed outwardly sideways the tines 24 of the rake following immediately behind the wheel 11 raise the blades of the grass back to their normal vertical position. Thus, the grass is in a position to be cut on the return of the lawn mower. With this relatively simple and inexpensive raking arrangement I have eliminated the troublesome rows of unmowed grass from the average house owner's lawn.

Rakes in accordance with this disclosure may be mounted on each side of the lawn mower, one behind each of the two lawn mower wheels. One or both of the rakes may be raised when desired to the position shown by dotted lines in Figure 1, so as not to be used, and either or both may be quickly lowered to the position of use, simply by kicking with the foot.

While the preferred form of the invention has been illustrated and described it will be apparent that modifications are possible without departing from the scope thereof. Also, while the rake has been described as being made of metal, other suitable materials may be used, such as, for instance, a plastic material.

What is claimed is:

1. Apparatus for raking lawn grass comprising the combination of a lawn mower wheel, a lawn mower roller, and a rake attachment, said rake attachment comprising a mounting plate having a vertically elongated opening and adjustably mounted adjacent one end of said roller behind said wheel, a bracket pivotally mounted on said plate and extending laterally therefrom, a plurality of resilient raking tines attached to said bracket and extending downwardly vertically therefrom, and a spring attached to said pivotally mounted bracket and said plate forcing the lower ends of said tines downwardly and forwardly.

2. Apparatus for raking lawn grass comprising the combination of a lawn mower wheel, a lawn mower roller, a roller bracket supporting said roller, and a rake attachment, said rake attachment comprising a mounting plate attached to said roller bracket adjacent one end of said roller and behind said wheel, a tine supporting bracket mounted on said plate and extending laterally therefrom, a plurality of tines attached to said tine supporting bracket extending downwardly vertically therefrom, and resilient means forcing the lower end of said tines downwardly and forwardly.

3. A rake attachment for a lawn mower comprising a mounting plate having a vertically elongated opening for adjustable mounting thereof, a bracket pivotally mounted on said plate and extending laterally therefrom, a plurality of resilient raking tines attached to said bracket and extending downwardly vertically therefrom, and a spring attached to said pivotally mounted bracket and said plate forcing the lower ends of said tines downwardly and forwardly.

4. The combination of claim 3 in which the lower ends of said tines are curved forwardly.

5. The combination according to claim 4 including an extruding portion on said plate abutting against said bracket and restraining forward movement of the lower ends of said tines caused by the action of said spring.

MANUEL PIMENTEL.

REFERENCES CITED

The following references are of record in the file of this patent:

UNITED STATES PATENTS

| Number | Name | Date |
|---|---|---|
| 1,662,785 | Robertson | Mar. 13, 1928 |
| 1,768,080 | Kurihara | June 24, 1930 |
| 2,208,880 | Daggett | July 23, 1940 |